(No Model.)
P. H. LAUFMAN, Jr.
SHEARS FOR CUTTING OVAL PLATES.
No. 394,776. Patented Dec. 18, 1888.
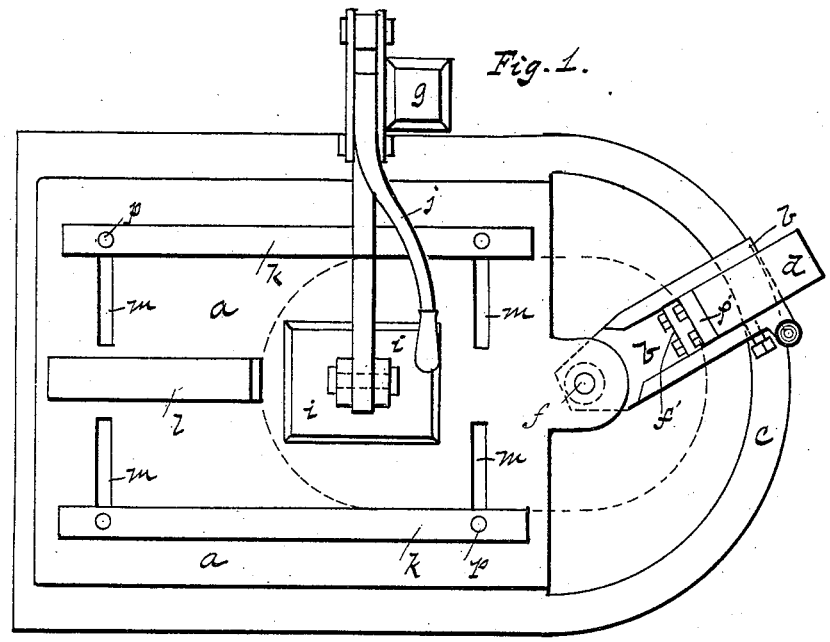
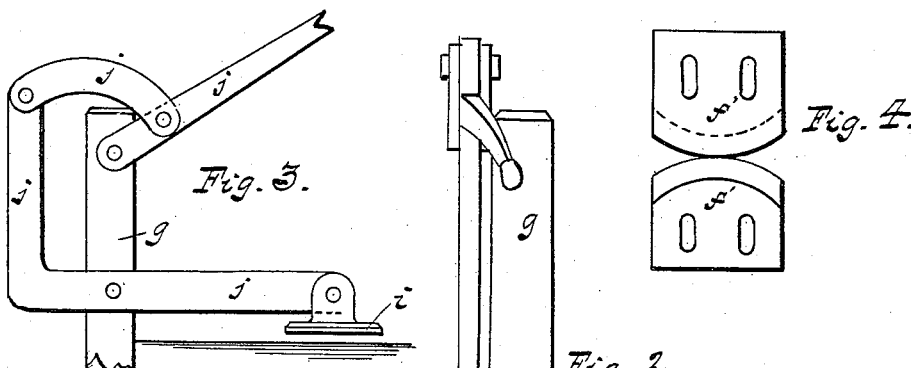
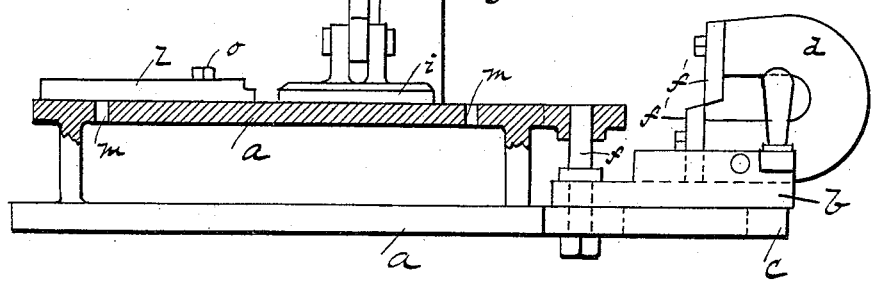
Witnesses:
M. E. Harrison
J. A. Herron
Inventor.
Phillip H. Laufman Jr
Per O. D. Levis
Att'y.

UNITED STATES PATENT OFFICE.

PHILLIP H. LAUFMAN, JR., OF APOLLO, PENNSYLVANIA.

SHEARS FOR CUTTING OVAL PLATES.

SPECIFICATION forming part of Letters Patent No. 394,776, dated December 18, 1888.

Application filed August 17, 1888. Serial No. 282,987. (No model.)

*To all whom it may concern:*

Be it known that I, PHILLIP H. LAUFMAN, Jr., a citizen of the United States, residing at Apollo, in the county of Armstrong and State of Pennsylvania, have invented certain new and useful Improvements in Shears for Cutting Oval Plates; and I do hereby declare the following to be a full, clear, and exact description of the invention, such as will enable others skilled in the art to which it pertains to make and use the same, reference being had to the accompanying drawings, which form a part of this specification.

My invention relates to an improvement in a machine for shearing oval plates; and it consists in two properly-constructed shear-blades mounted in a frame moving about a pivot in the form of a semicircle, a means for adjusting the shear-blades toward or from the pivot, whereby large and small sizes of ovals may be formed, a device for clamping the sheet to the table, and an adjustable gage for centering the sheet, together with certain other details of construction and combination of parts, as will be fully set forth hereinafter.

In the accompanying drawings, Figure 1 is a plan view of my improved shears constructed in accordance with my invention. Fig. 2 is a side elevation of the same, partly shown in section the better to show its working parts. Fig. 3 is a side elevation showing the arrangement of the several levers used for securing the sheet to the table. Fig. 4 is a front elevation of the shears.

To construct a machine in accordance with my invention, I provide a table, $a$, of suitable size and form of construction, and pivot to the forward end of the same a carriage, $b$, which may be revolved in a semicircle about a guide, $c$. Mounted in a groove or slide in this carriage $b$ is a shear-frame, $d$, capable of being adjusted toward or from the pivot $f$. Two shear-blades, $f'$, are attached to this frame $d$, the cutting-edges of which are circular and overlap each other at the center. At the rear of the table $a$ is a vertical extension, $g$, of the same, to which is attached a device for clamping the blanks in position, consisting of a plate, $i$, operated vertically by a system of levers, $j$. At each side of this plate $i$ are strips $k$, which are used as guides for properly placing the blank in position. These strips $k$ may be adjusted toward or away from the center of the table $a$ by means of bolts $p$ and slots $m$ formed in the same. At the rear of the clamping-plate $i$ is a gage-strip, $l$, which may be moved toward the plate $i$ or away from the same.

The operation of my invention is as follows: To cut a plate with semicircular ends and parallel sides, the gages $k$ $l$ are first adjusted on the table in an obvious manner to accommodate a blank of the size to be operated on, which is then placed in position on the table between the gages and firmly clamped in place by lowering the central clamping-plate, which can be easily effected by simply depressing the lever $j$. It will be noted by reference to Figs. 1 and 2 that the carriage proper is on a lower plane than the table $a$, and that the shears $f'$ $f'$ are on the same horizontal plane of the blank of sheet metal to be cut. It will also be noted that one end of the blank of sheet metal projects or extends beyond the edge of the table. After the blank has been properly adjusted and clamped in position the carriage $b$ is turned or swung on its pivot $f$ until it is substantially at right angles to the table, so that the shears $f'$ clear the sheet-metal blank, and the carriage is now swung or forced by hand toward the blank, which is guided between the shears when the latter reach the blank. The operator continues to force the carriage around on its pivot, which travels in the arc of a circle, and as the metal blank passes between the shears it is cut by the same, the end of the sheet-metal blank being of semicircular contour when the carriage has completed its course. The lever is now raised to release the clamping-plate, the blank is reversed to present the other end to the shears, and the operation is repeated.

Having thus described my invention, what I claim, and desire to secure by Letters Patent, is—

1. In a machine for shearing plates, the combination consisting of the table $a$, having pivoted to its forward end a carriage, $b$, capable of moving about a semicircular guide, $c$, the shear-frame $d$, adjustably secured in said carriage $b$, the clamping-plate $i$, and levers $j$, for operating the same, and the gage-strips $k$ $l$ and a means for adjusting the same, substantially as described.

2. In a machine for shearing metal, the combination, with a table and a clamp for holding the work thereon, of a swinging carriage located on a plane below said table and pivoted at one end thereto to describe an arc of a circle, and the stationary shears $f'\ f'$, fixed to the carriage and having their cutting-edges meeting on a horizontal plane slightly elevated above the upper surface of the table, whereby as the carriage is moved on its pivot the shears receive the work between themselves and cut the same on an arc of a circle, substantially as and for the purpose described.

3. In a machine for shearing metal, the combination, with a table and a clamp for holding the work thereon, of a carriage arranged at one end of the table on a lower horizontal plane and pivoted at one end to describe an arc of a circle, and shears mounted on the carriage on the same horizontal plane as the table, said shears being adjustable longitudinally on the carriage toward or from the pivot thereof, substantially as and for the purpose described.

In testimony that I claim the foregoing I hereunto affix my signature this 7th day of June, A. D. 1888.

PHILLIP H. LAUFMAN, Jr. [L. S.]

In presence of—
    FRANK W. SMITH,
    M. E. HARRISON.